Sept. 30, 1969  D. C. DOUGLASS  3,470,437

MOTOR SPEED REGULATOR

Filed Sept. 8, 1966  2 Sheets-Sheet 1

DONALD C. DOUGLASS
INVENTOR.

BY *Louis Mok*

ATTORNEY

Sept. 30, 1969 D. C. DOUGLASS 3,470,437
MOTOR SPEED REGULATOR
Filed Sept. 8, 1966 2 Sheets-Sheet 2
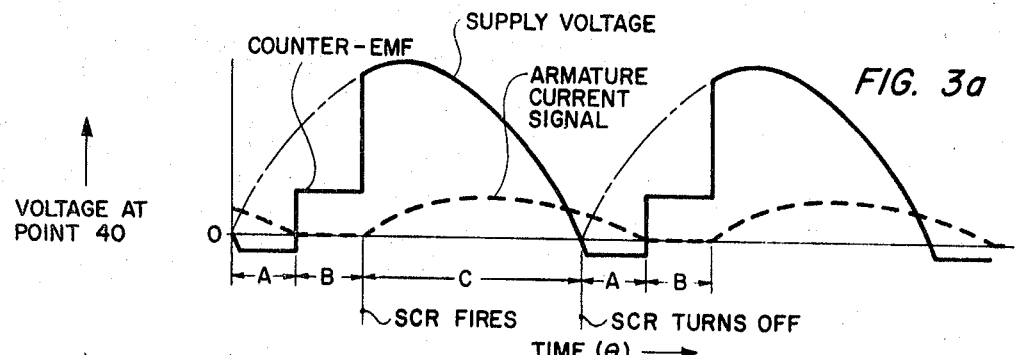
FIG. 3a
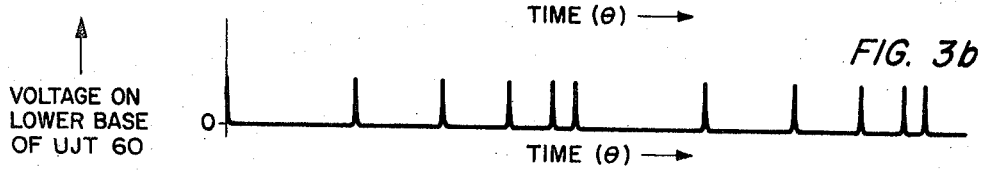
FIG. 3b
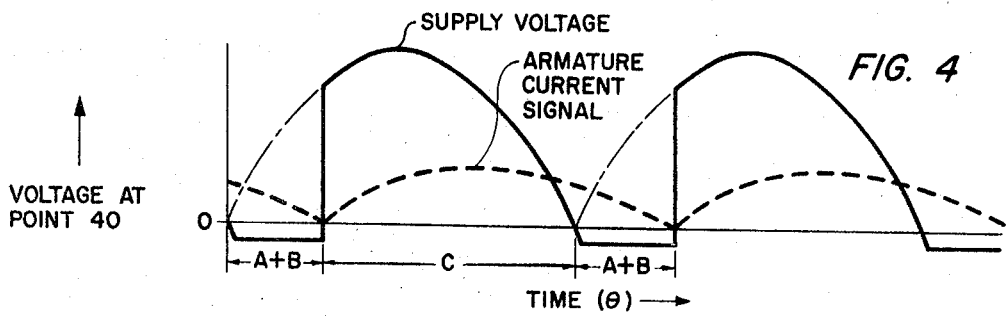
FIG. 4
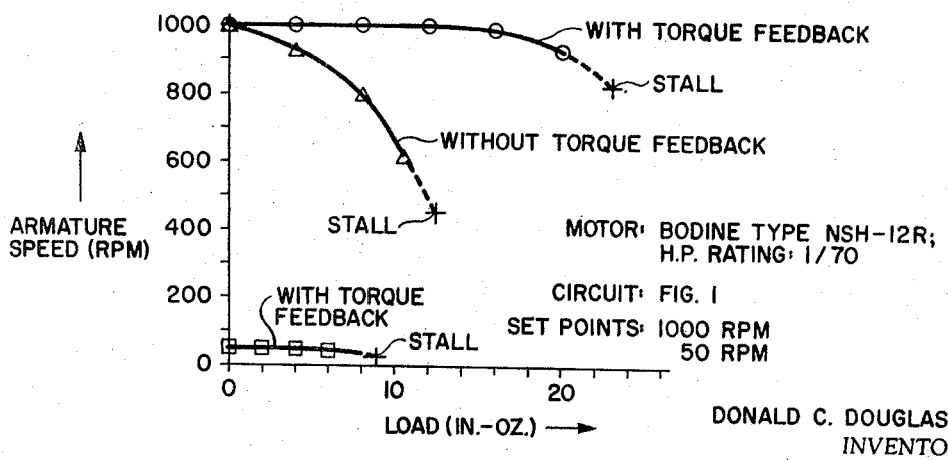
FIG. 5
DONALD C. DOUGLASS
INVENTOR.
BY 
ATTORNEY //nited States Patent Office 3,470,437
Patented Sept. 30, 1969

3,470,437
MOTOR SPEED REGULATOR
Donald C. Douglass, Pomona, Calif., assignor to Beckman Instruments, Inc., a corporation of California
Filed Sept. 8, 1966, Ser. No. 578,048
Int. Cl. H02p 5/28, 7/36; H02k 27/20
U.S. Cl. 318—308
9 Claims

ABSTRACT OF THE DISCLOSURE

A circuit for the control and regulation of the speed of a direct current motor having a shunt field over a large range of high torque operating conditions is disclosed. Speed is regulated by controlling the energy delivered to the armature. The control is accomplished by means of two feedback signals which are combined in such a fashion as to generate pulses in a timing circuit to initiate conduction of a silicon controlled rectifier through which energy is supplied to the armature. One feedback control signal is a function of the counter-E.M.F. during free-wheeling. The other feedback control signal is proportional to armature current during free-wheeling. The circuit combines these two feedback signals in such a manner that the energy supplied to the armature is decreased with increasing counter-E.M.F. and is increased with increasing armature current so as to provide constant speed over a greater torque range than heretofore possible. Energy is supplied through a semiconductor diode full-wave rectifier to the parallel combination of the shunt field, the armature in series with the energy controlling gate, and the timing circuit. The unfiltered full-wave output of the bridge rectifier is applied directly to this combination.

---

This invention relates in general to motor control circuits and in particular to circuits for regulating the speed of direct current motors over a wide speed range by controlling the duration of voltage pulses applied to the motor armature.

It is often necessary to accurately control the speed of a direct current motor despite fluctuations in the load being driven. Numerous types of speed regulators have been devised for this purpose. One type of regulator employs a normally nonconducting gating or switching device, such as a silicon controlled rectifier (SCR), connected in series with the armature of the motor which is powered by unidirectional voltage having periodic pulses or variations such as the signal produced by full-wave rectified alternating current. Since motor speed is a function of the counter-E.M.F. developed by the rotating motor (assuming a constant field), a signal representing the counter-E.M.F. may be used to control the time of operation of the switching device to vary the duration of voltage pulses applied to the motor armature thereby maintaining constant motor speed for varying load conditions.

One of the problems associated with speed regulators of the prior art is that at high motor loads the signal representing the counter-E.M.F. becomes so small that it is ineffective as a control signal. One result is that the controlled speed envelope of the motor is limited to relatively high speed/low torque operating conditions.

It is therefore an overall object of the present invention to provide a direct current motor speed regulator capable of controlling speed over a large range during high torque operating conditions.

It is a more specific object of the present invention to provide a direct current motor speed regulator which makes use of a signal representing the armature current during motor free-wheeling to enable the motor to maintain a constant speed over a greater torque range than heretofore possible and to extend the operating capabilities of the motor to low speed, high torque conditions.

According to one specific, exemplary embodiment of the present invention shown and described herein, a source of full-wave rectified voltage powers the D.C. motor and a timing circuit which periodically switches an SCR, serially connected with the motor armature, into the conductive state. The timing circuit includes a voltage difference amplifying circuit and a pulse generating means. A set point signal, representative of the desired motor speed, is applied to the timing circuit as a reference. Two separate feedback paths are provided between the motor circuit and the voltage difference amplifying circuit to control the SCR switching process whereby motor speed is maintained substantially constant irrespective of torque variations. The first feedback control signal is a function of the counter-E.M.F. during free-wheeling. The second feedback control signal is proportional to armature current during free-wheeling. These two signals are applied to the voltage difference amplifying means whose output, which includes at least the difference between the two feedback control signals, controls the timing of the pulse generating means. The pulse generating means produces time-positioned pulses in accordance with the magnitude of the difference circuit output signal. As the motor load increases, the armature current signal, appropriately scaled and amplified, becomes increasingly predominant as the control signal and the controlled speed range is thereby extended to include relatively high torque conditions.

The novel features which are believed to be characteristic of the invention are set forth with particularity in the appended claims. The invention itself however, together with further objects and advantages thereof, can best be understood by reference to the following description taken in connection with the accompanying drawings in which:

FIGS. 3a, 3b and 4 show graphical representations of voltage waveforms appearing at selected points in the circuit of FIG. 1; and FIG. 5 is a graph showing the low speed operating capabilities of a D.C. motor using the circuit of FIG. 1 and comparing the performance characteristics of the circuit of FIG. 1 with and without torque feedback.

Figure 1:
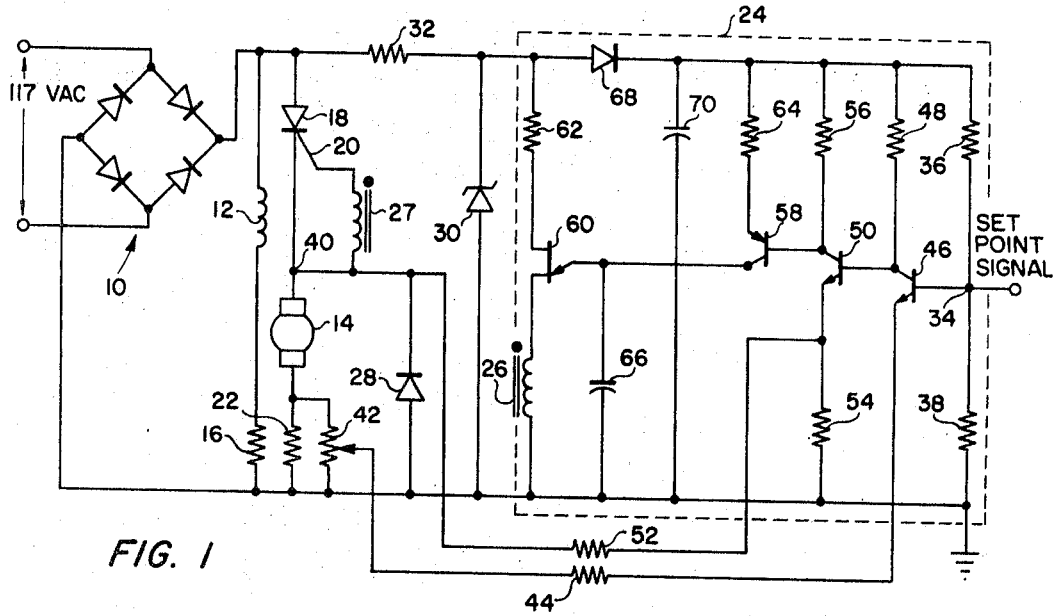
FIG. 1 is a circuit schematic of an embodiment of the present invention employing one form of timing circuit.

Turning now to FIG. 1 of the drawings, fullwave rectified voltage, derived from an alternating current source through a bridge-type rectified voltage, derived from an alternating current source through a bridge-type rectifier 10, is applied to the field 12 and the armature 14 of a direct current motor. The field 12 is connected in series with a field dropping resistor 16 across the output of the rectified 10. Also connected across the rectifier output is the series combination of a silicon controlled rectifier 18 having a gate 20, the armature 14 and a resistor 22. When a signal of the proper polarity and magnitude is applied to the gate electrode 20 of the SCR 18, the SCR will conduct provided that its anode is positive with respect to its cathode. Triggering the SCR 18 into conduction is accomplished by means of a pulse timing circuit 24 coupled to the gate 20 through a transformer having a primary winding 26 and a secondary winding 27. The timing circuit will be described in detail below.

To assist in cutting off the SCR 18 when the applied voltage reaches its zero value, a bypass diode 28 is connected across the series combination of the armature 14 and the resistor 22. During the portion of the cycle that no voltage is applied to the armature, that is, when the SCR 18 is in the nonconducting state, the current caused by the "inductive kick" of the motor flows through the diode 28. The forward drop across the diode 28 in this interval insures that the SCR 18 will be reverse-biased to render it nonconducting.

The timing circuit 24, of the type employing a pulse generating means including, for example, a unijunction transistor trigger 60, is clamped to a fixed voltage level by a zener diode 30 connected in series with a dropping resistor 32 across the rectifier output. The circuit 24 has three inputs which serve to control motor speed. The first input comprises a reference or set point signal applied to the junction 34 of a voltage divider comprising resistors 36 and 38. The second control signal originates at the armature terminal 40 and is indicative of the counter-E.M.F. during motor free-wheeling. The third input to the timing circuit is representative of the armature voltage drop $I_a R_a$ in which $I_a$ is armature current and $R_a$ represents armature resistance. This signal, developed across a portion of a small armature current sensing resistor or potentiometer 42, is proportional to the current flowing through the armature and therefore is representative of motor torque. The armature current signal is connected through a resistor 44, having an appropriate value for scaling purposes, to the emitter of an NPN transistor 46. The signal at junction 34, representing the set point, is connected to the base of the same transistor. The output of the transistor 46, developed across the load resistor 48, is a function of the difference between the signals applied to the base and to the emitter. This ouput is coupled directly to the base of a second NPN transistor 50, connected in cascade with the transistor 46, which serves to amplify and mix this signal with the signal representing the counter-E.M.F. voltage. The latter signal, picked up at point 40, is dropped for scaling purposes across a resistor 52 and applied to the emitter of the transistor 50 across an emitter biasing resistor 54. The transistors 46 and 50 comprise a voltage difference amplifying means as will become evident in the description of the circuit operation, below. Thus, the composite output signal appearing across the load resistor 56 at the collector of the transistor 50 is a function of the set point signal level less the difference between the counter-E.M.F. voltage and the voltage representing the armature current. It is this signal, suitably amplified by a PNP transistor amplifier 58, which determines the firing angle of the pulse generating means.

The pulse generating means may be in the form of a conventional, free running oscillator circuit synchronized to line frequency and comprising a unijunction transistor 60, resistors 62 and 64, a capacitor 66 and the primary winding 26 of the coupling transformer. The resistor 62 is connected between the supply and the upper base electrode of the unijunction transistor 60 and the resistor 64 interconnects the emitter of PNP transistor 58 and the supply. The collector of transistor 58 is coupled to the emitter electrode of the transistor 60 and capacitor 66, which serves as the timing capacitor, is connected between the unijunction emitter and the reference potential or ground. The latter connection places the collector circuit of the transistor 58 and the capacitor 66 in series. The capacitor will therefore charge at a rate determined by the collector current of transistor 58 which is dependent upon the magnitude of the signal applied as an input to that transistor. Capacitor 66 charges to the unijunction transistor triggering voltage which is a fixed fraction (commonly referred to as the intrinsic standoff ratio) of the interbase voltage. The low impedance path created between the emitter and the lower base when the unijunction fires, permits the capacitor 66 to discharge through the primary winding 26 of the transformer which is connected between the lower base and ground. The pulse induced in the secondary winding 27 of the transformer triggers the SCR 18 into conduction. As the capacitor 66 discharges, the emitter current of the unijunction transistor 60 drops below the holding current level and the unijunction ceases to conduct. The capacitor 66 "resets" when the voltage across the motor armature passes through zero at the end of the period during which the SCR 18 conducts.

To increase the operating stability of the timing circuit and to eliminate noise transmission between the Zener diode-regulating supply and the timing circuit 24, a decoupling diode 68 and a filter capacitor 70 are provided. The timing circuit is thereby supplied with nearly pure D.C. with the result that motor speed is substantially independent of line voltage over an extremely large range.

In describing the operation of the circuit of FIG. 1, it will be useful to refer to the waveforms depicted in FIGS. 2a, 3b and 4. FIG. 3a represents the voltage appearing at point 40, that is, across the series combination of the motor armature 14 and the parallel resistor network 22, 42. Superimposed over the armature voltage waveform in FIG. 3a is a waveform shown as a broken line representing the voltage across the tapped portion of the potentiometer 42. FIG. 3b is the voltage appearing on the lower base of the unijunction transistor, that is, across the transformer primary 26. The letter A denotes the portion of the motor free-wheeling period during which the armature shunting diode 28 is forward biased, in effect clamping the armature voltage at about −1 volt. The counter-E.M.F. appears during the period designated B and the period of SCR conduction is represented by C.

The torque and counter-E.M.F. information during periods A and B, respectively, is fed back to control the pulse timing circuit 24 which produces a pulse across the winding 26 at the end of the period B (FIG. 3b) to fire the SCR 18 at the required angle. Referring to FIG. 3b, it will be noted that several additional pulses may be generated during period C. These pulses have no effect, of course, since the SCR 18 is already in the conductive state. At the end of period C, when the line voltage passes through zero, the SCR commutates and the capacitor 66 is "reset," its charging rate during the periods A and B being dependent upon the magnitude of the speed and torque information being fed back.

As the load applied to the motor increases, the firing angle advances thus decreasing the duration of period B and simultaneously increasing the period A during which the diode 28 conducts. The cumulative effect is to "squeeze out" the counter-E.M.F. signal appearing during period B. When the duration of period B approaches zero, the signal representing motor counter-E.M.F. is no longer effective to control motor speed. The limiting situation is shown in FIG. 4 in which the counter-E.M.F. step has virtually disappeared. The torque signal however, now dominates the regions A and B and this signal, appropriately scaled and amplified, may be used to control the motor speed.

Referring once again to FIG. 1, an increased motor load results in a larger armature current which increases the voltage drop across the tapped portion of the sensing resistor 42. The potential at the emitter of the transistor 46 therefore swings positive in proportion to the armature current increase. Assuming a constant set point voltage applied to the base of the transistor 46, the result is a decrease in collector current and a positive going voltage signal applied to the base of the transistor 50. This tends to aid the forward bias of the base-emitter junction and to turn on the transistor 50, decreasing the potential at the collector with respect to the supply. As a result, the collector current of PNP transistor 58 increases, thereby increasing the charging rate of the capacitor 66 and advancing the firing angle of the unijunction transistor. The transistor 46 acts as a preamplifier, amplifying the torque signal before it is mixed with the armature voltage signal applied to the emitter of the transistor 50. During high speed, low torque operating conditions, the armature voltage signal, originating at the node point 40, tends to predominate, the armature current $I_a$ having been reduced in correspondence to the low load.

The following are preferred circuit values and components for the circuit shown in FIG. 1:

Resistors (all ½ w. except as noted):

| | | |
|---|---|---|
| 16 (10 w.) | ohms | 500 |
| 22 | do | 1 |
| 32 (5 w.) | do | 3.5K |
| 42 (pot.) | do | 5 |
| 44 | do | 43 |
| 48 | do | 5K |
| 52 | do | 62K |
| 54 | do | 2.4K |
| 56, 64 | do | 200 |
| 62 | do | 100 |

Capacitors:

| | | |
|---|---|---|
| 66 | µf | 0.1 |
| 70 | µf | 250 |

Diodes:

| | |
|---|---|
| F.W. rectifier, 28, 68 | 1N1693 |
| 18 | C15A |
| 30 (20 v., 1 w. Zener) | 1N1527 |

Transistors:

| | |
|---|---|
| 46, 50 | 2N1303 |
| 58 | 2N524 |
| 60 | 2N1671 |

Transformer: Triad _____ N-68X

FIG. 5 is, in part, a plot of motor speed versus dynamometer load applied to the armature of a Bodine D.C. motor, type NSH12R, rated at 1/70 H.P., comparing the effect on motor speed of the application of increasing loads with and without torque feedback. The circuit of FIG. 1 was utilized and the lower curve shows the results when the torque feedback signal was disconnected. It will be seen that without such feedback, there is a steady decline in motor speed with increasing torque until at about 10.5 in.-oz. the motor speed has diminished to 600 r.p.m. The counter-E.M.F. signal could no longer be distinguished on the oscilliscope at 10.5 in.-oz. and stall occurred at about 13 in.-oz. On the other hand, with torque feedback in accordance with the present invention, the set point speed of 1000 r.p.m. was maintained with dynamometer loads up to 14 in.-oz., the curve remaining relatively flat until stall was approached at 23 in-oz.

The curve appearing in the lower portion of the graph of FIG. 5 shows the operating capabilities of the motor at low r.p.m. A set-point speed of 50 r.p.m. was maintained up to 5 in.-oz. with a gradual decrease in speed then occurring. These capabilities could not be achieved without the torque feedback of the present invention.

Figure 2:
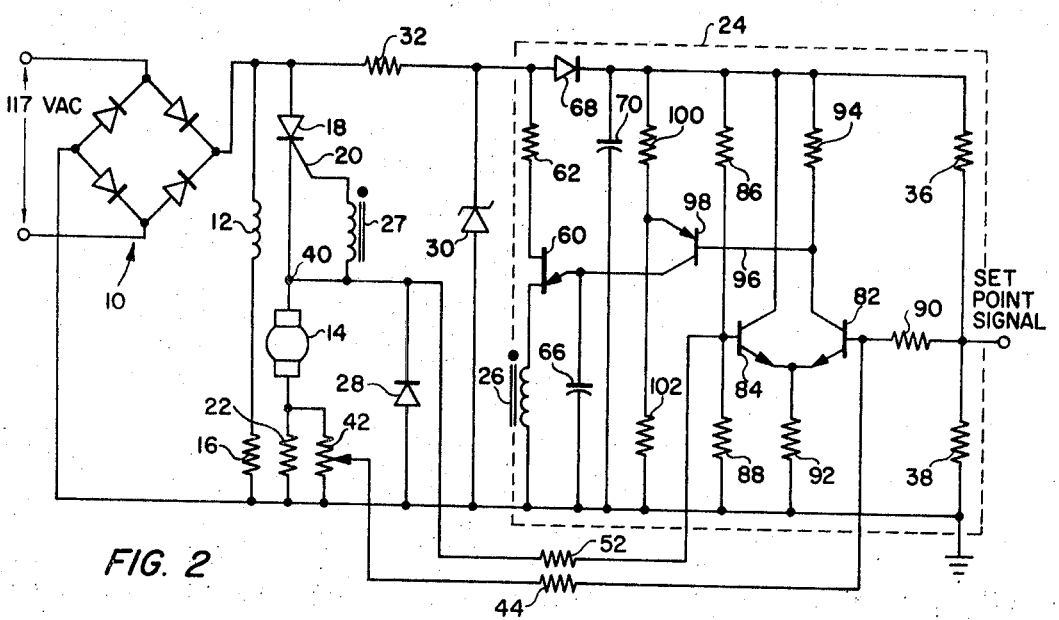
FIG. 2 is a circuit schematic of another embodiment of the present invention in which an alternative form of timing circuit, employing a differential amplifier, is utilized.

FIG. 2 of the drawings shows an alternative embodiment of the present invention in which a differential amplifier, having input signals representative of the counter-E.M.F. and the armature current and an output signal, at least a portion of which is proportional to the difference of the input signals, is employed. Turning now to the details of FIG. 2, the elements corresponding functionally to those of FIG. 1 are designated by the same reference numerals. An emitter coupled differential amplifier 80, comprising NPN transistors 82 and 84, is connected across the supply voltage, the signal representative of the armature current, properly scaled, being applied to the base of the transistor 82 as a first input and the counter-E.M.F. signal being applied to the base of the transistor 84 as a second input via a voltage divider comprising resistors 86 and 88. The set point signal, representing the desired motor speed, is applied to the base of the transistor 82 through the divider 36, 38 and a series resistor 90. A common emitter biasing resistor 92 connects the common emitter junction of the differential amplifier 80 with the reference potential. The collector of transistor 82 is connected to the plus supply through a load resistor 94 and the collector of transistor 84 is coupled directly to the supply. A single ended output, taken across the load resistor 94, appears on a conductor 96 which is connected to the base of an amplifying stage in the form of a PNP transistor 98. The signal from the collector of this transistor is applied to the emitter junction of the unijunction transistor 60. Biasing of the emitter of PNP transistor 98 is accomplished by the divider network consisting of resistors 100 and 102.

In operation, the voltage signal appearing on the conductor 96, which is a composite of the counter-E.M.F., torque and set point signals, controls the biasing of the transistor 98 which in turn controls the charging rate of the capacitor 66 through the resistor 100. Increasing the motor load, for example, tends to make the signal on line 96 less positive thereby aiding the forward bias of the base-emitter junction of transistor 98 so as to cause the firing angle of the unijunction 60 to advance. As in the first embodiment described in connection with FIG. 1, in the high torque operating region of the motor, the armature current or torque signal predominates and accurate speed control is thereby maintained at high loads and into the very low speed ranges.

Typical components and values thereof for the circuit of FIG. 2 are as follows:

Resistors (all ½ w. except as noted):

| | | |
|---|---|---|
| 16 (10 w.) | ohms | 500 |
| 22 | do | 1 |
| 32 (10 w.) | do | 3K |
| 42 (pot.) | do | 2 |
| 44 | do | 10K |
| 52 | do | 620K |
| 62 | do | 100 |
| 86 | do | 3.3K |
| 88 | do | 1.5K |
| 90 | do | 10K |
| 92 | do | 4.3K |
| 94 | do | 6.8K |
| 100 | do | 4.7K |
| 102 | do | 30K |

Capacitors:

| | | |
|---|---|---|
| 66 | µf | 0.15 |
| 70 | µf | 500 |

Diodes:

| | |
|---|---|
| F.W. rectifier, 28, 68 | 1N1693 |
| 18 | C15A |
| 30 (22 v., 5 w. Zener) | 1N1527 |

Transistors:

| | |
|---|---|
| 60 | 2N1671 |
| 82, 84 | 2N1304 |
| 98 | 2N1303 |

Transformer: Triad _____ N-68X

It will be obvious to those skilled in the art that various modifications may be made to the specific, exemplary embodiments of the invention described. While particular embodiments have been discussed, it will be understood that the invention is not limited thereto.

What is claimed is:

1. A circuit for regulating the speed of a direct current motor comprising
   a source of unidirectional voltage having a periodic variation and periodically having a substantially zero magnitude, said source being connected to the field and armature of said motor;
   normally nonconducting switching means serially connected between said source and said armature;
   timing circuit means having an output operative connected to said switching means for rendering said switching means conductive during a portion of each periodic variation of said source voltage, said motor free-wheeling when said switching means is in the nonconducting state, said timing circuit means including voltage difference circuit means;
   a set point signal, representing a function of desired motor speed, connected as an input to said timing means for controlling the time of energization of said timing means output;

a first control signal, representing armature current during free-wheeling of said motor connected as a first input to said voltage difference circuit means;

a second control signal, representing the voltage sensed across said armature during motor free-wheeling, connected as a second input to said voltage difference circuit means, said voltage difference means having an output connected to control said timing means output; and means shunting said armature for rendering said switching means nonconductive when said unidirectional voltage has said substantially zero magnitude.

2. A circuit, as defined in claim 1, in which said voltage difference circuit means includes first and second amplifiers connected in cascade, said set point signal being connected as a first input to said first amplifier and said first control signal being as a second input to said first amplifier, said second control signal being applied as an input to said second amplier, the output of said second amplifier being connected to control said timing circuit means output.

3. A circuit, as defined in claim 1, in which said voltage difference circuit means comprises a differential amplifier having an output signal, said first control signal being applied as a first input to said differential amplifier and said second control signal being applied as a second input to said differential amplifier, said differential amplifier output signal including the difference between said input signal and being connected to control said timing circuit means output.

4. A circuit for regulating the speed of a direct current motor including a field and an armature, comprising a source of unidirectional voltage having a periodic variation and periodically having a substantially zero magnitude, said source being connected to said motor field;

a normally nonconducting switching means;

an armature current sensing resistor connected in series with said swtiching means and said motor armature across said source;

a voltage differential amplifying circuit having first, second and third inputs and an output;

a first control signal, originating at an armature terminal of said motor and being indicative of motor counter-E.M.F. during motor free-wheeling, connected to said first input;

a second control signal, obtained across said sensing resistor and being indicative of said armature current during motor free-wheeling, connected to said second input;

a set point signal, representing the desired motor speed, being applied to said third input, said voltage difference amplifying circuit output delivering a signal representing the departure of the difference between said first and second control signals from said set point signal;

pulse generating means controlled by said difference amplifying circuit output signal for producing pulses positioned in time in accordance with the magnitude of said output signal;

means for applying said time positioned pulses to said switching means to render it conductive; and means operative when said source voltage approaches zero to render said switching means nonconducting.

5. A circuit, as defined in claim 4, in which said voltage difference amplifying circuit and said pulse generating means are powered by said source of unidirectional voltage;

and which includes decoupling and filtering means in said source whereby said voltage difference amplifying circuit powered is direct current independent of line fluctuations.

6. A circuit, as defined in claim 4, in which said voltage difference amplifying circuit includes a preamplifier having an output, said first control signal and said set point signal being applied as first and second inputs to said preamplifier; and an amplifier, said preamplifier output and said second control signal being applied as first and second inputs to said amplifier, said amplifier supplying an output signal the magnitude of which controls said pulse generating means.

7. A circuit, as defined in claim 6, in which said pulse generating means includes an amplifying stage having an input connected to said amplifier output and an output, said amplifier output controlling the biasing of said amplifying stage, said amplifying stage output being connected to control the triggering of said time positioned pulses.

8. A circuit, as defined in claim 4, in which said voltage difference amplifying circuit includes a differential amplifier having as inputs said first and second control signals and an output at least a portion of which is proportional to the difference between said inputs, said differential amplifier output connected to control said pulse generating means.

9. A circuit, as defined in claim 8, in which said pulse generating means includes an amplifying stage having an input connected to said differential amplifier output and an output, said differential amplifier output controlling the biasing of said amplifying stage, said amplifying stage output being connected to control the triggering of said time positioned pulses.

References Cited

UNITED STATES PATENTS

| 3,231,808 | 1/1966 | McDaniel | 318—331 |
| 3,316,472 | 4/1967 | Taylor | 318—331 |
| 3,327,195 | 6/1967 | Mason | 318—331 |
| 3,384,812 | 5/1968 | Ivy et al. | 318—332 |

ORIS L. RADER, Primary Examiner

ROBERT J. HICKEY, Assistant Examiner

U.S. Cl. X.R.

318—332, 345

PO-1050
(5/69)

UNITED STATES PATENT OFFICE
CERTIFICATE OF CORRECTION

Patent No. 3,470,437          Dated September 30, 1969

Inventor(s) Donald C. Douglass

It is certified that error appears in the above-identified patent and that said Letters Patent are hereby corrected as shown below:

Column 6, line 67, "operative" should read --operatively--;
Column 7, line 9, after "difference" insert --circuit--;
Column 7, line 19, after "being" insert --applied--;
Column 7, line 22, "amplier" should read --amplifier--;
Column 7, line 43, "swtiching" should read --switching--;
Column 7, line 45, "differential" should read --difference--;
Column 8, line 14, after "powered" insert --supply--.

SIGNED AND
SEALED
MAY 5 1970

(SEAL)
Attest:

Edward M. Fletcher, Jr.
Attesting Officer

WILLIAM E. SCHUYLER, JR.
Commissioner of Patents